Aug. 4, 1953  W. VAN B. ROBERTS ET AL  2,647,948
ELECTROMECHANICAL FILTER

Filed March 30, 1949  2 Sheets—Sheet 1

FRACTIONAL BAND WIDTHS $\frac{4}{\pi} P(1-P)$ $\frac{2}{\pi} P\left(1-\frac{P}{2}\right)$ $\frac{4}{\pi} \frac{1}{P}\left(1-\frac{1}{P}\right)$ $\frac{4}{3\pi} \frac{1}{P}\left(1-\frac{1}{3P}\right)$ INVENTORS
*Walter van B. Roberts, &
Leslie L. Burns, Jr.*
By Harry Trunek
ATTORNEY

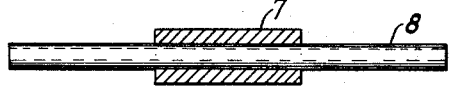
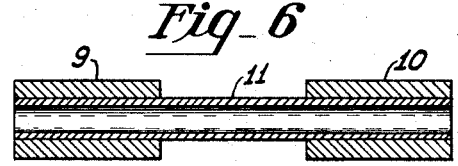
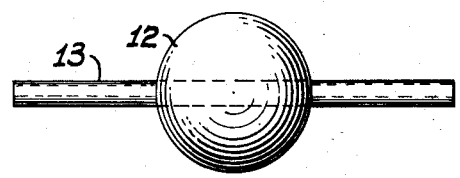
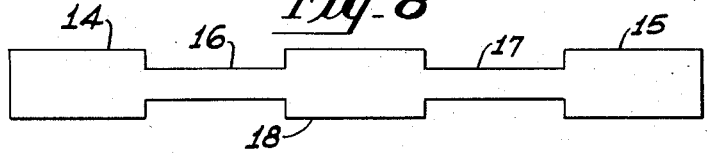
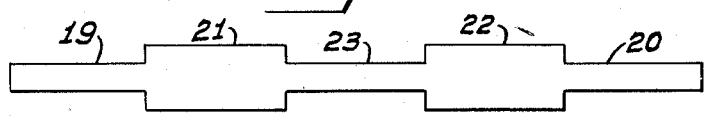
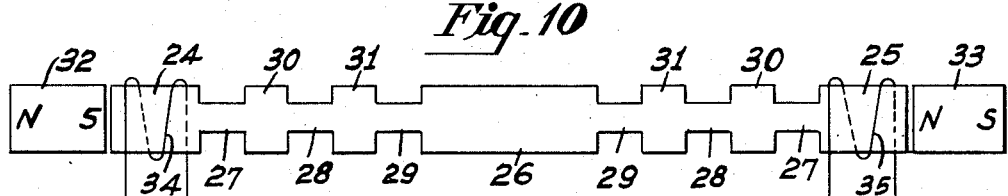
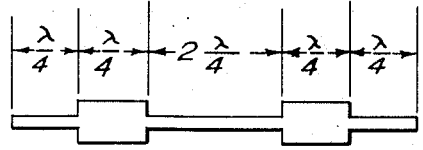
INVENTOR
Walter van B. Roberts, &
Leslie L. Burns, Jr.
By Harry Tunick
ATTORNEY Patented Aug. 4, 1953

2,647,948

UNITED STATES PATENT OFFICE 2,647,948

ELECTROMECHANICAL FILTER

Walter van B. Roberts and Leslie L. Burns, Jr., Princeton, N. J., assignors to Radio Corporation of America, a corporation of Delaware Application March 30, 1949, Serial No. 84,372

12 Claims. (Cl. 333—71)

This invention relates to electromechanical filters, and more particularly to band pass filters of the mechanically-vibrating type.

A vibrating metal resonator has a rather low decrement compared to an electrical circuit. For example, the Q of a mechanical resonator or "tank" is of the order of a few hundred for nickel, several thousand for various steels, and as high as ten thousand for aluminum and its alloys. Furthermore, at radio frequencies the metal tank is small and cheap compared to the corresponding electrical tank, so that many of such metal tanks can be used in a filter. Thus, the high Q and small size of metal resonators make them desirable for use in multi-section filters for low radio frequencies.

An object of this invention is to devise a simple type of band pass filter composed of loosely coupled metal resonators.

Another object is to devise band pass filters which have extremely narrow pass bands.

A further object is to provide various expedients by the use of one or more of which the pass bands of electromechanical filters may be narrowed.

A still further object is to devise a small, simple and cheap band pass filter for low radio frequencies.

The foregoing and other objects of the invention will be best understood from the following description of some exemplifications thereof, reference being had to the accompanying drawings, wherein:

Fig. 5 is a section through a slug-type filter according to this invention;

Fig. 6 is a section through a modified neck-type filter of this invention;

Fig. 7 is a section through another embodiment of a filter of this invention;

Figs. 8 and 9 are schematic representations of further embodiments of the invention;

Fig. 10 is a partly diagrammatic representation of another filter according to the invention: and Fig. 11 is a schematic representation of a multi-section filter having a plurality of sections like those of Fig. 4c.

Figure 1:
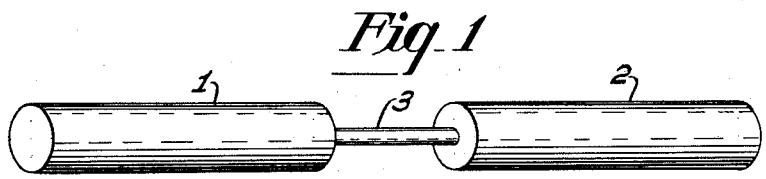
Fig. 1 is a schematic view of the basic filter unit of the invention.

The basic unit of the filters to be described is a single section filter composed of a pair of similar longitudinal resonators loosely coupled together so as to possess a pair of resonant frequencies marking the limits of its transmission band. Fig. 1 shows, as one way of making such a section, a pair of half-wave-length metallic resonators or tanks 1 and 2 connected together by a metallic neck coupling portion 3 so thin as to act like a weak spring. Both ends of each resonator 1 and 2 are motional loops at each of the resonant frequencies.

Figure 2:
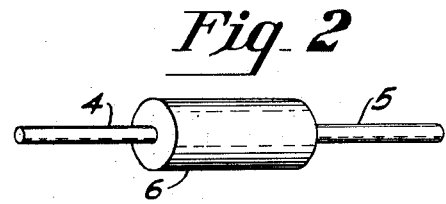
Fig. 2 is a representation of another embodiment of a basic filter unit.

On the other hand, Fig. 2 shows a pair of quarter-wave metallic tank resonators 4 and 5 coupled by a metallic "slug" 6 which is relatively thick, so that it acts somewhat as a heavy mass. In this case, only the free ends of the resonators 4 and 5 are motional loops.

In the cases of both Figs. 1 and 2, the tanks 1, 2 and 4, 5 are longitudinally vibratory elements connected by coupling elements 3 and 6 adapted to transmit vibrations from each tank to its neighbor.

The band limits in either case can be determined by calculating the frequencies at which the tanks are resonant when vibrating in the same phase and in opposite phases. However, to obtain a more complete picture it is desirable to make use of the fact that these filter sections are mathematically equivalent to electrical filters composed of equal lengths of transmission line connected by a piece of line of different characteristic impedance. This equivalence may be made use of by assuming that the tanks are composed of elements of uniform cross-section and the couplers also of uniform cross-section, but of different mechanical impedance. The term "mechanical impedance" is here defined as the product of the density of the material, its cross-sectional area and the velocity of compressional waves along the tank or coupler. If the respective tanks and couplers of Figs. 1 and 2 are all made of the same material, the mechanical impedance of the tanks will be different from that of the couplers, due to their different cross-sectional areas, the tanks having higher impedance than the coupler in Fig. 1 and vice versa in Fig. 2. Both Figs. 1 and 2, however, disclose single section filters, that is to say filters comprising two tanks and a single coupler.

Figure 3:
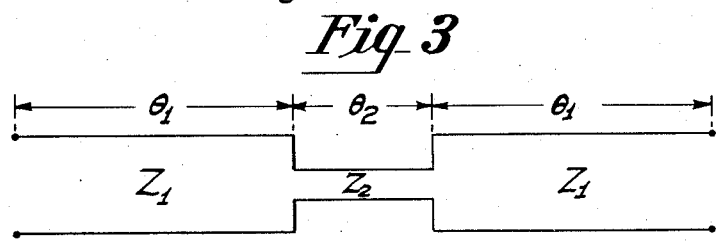
Fig. 3 represents the transmission line analogy of Fig. 1.

Fig. 3 shows the electrical filter section corresponding to Fig. 1. Its tank portions have electrical length $\theta_1$ and characteristic impedance $Z_1$ while the connecting portion has length $\theta_2$ and impedance $Z_2$. The pass bands for a filter composed of any number of such sections connected end to end are the frequency ranges within which the iterative impedance of the section has a real component, so that it can accept power from the driven end. The expression for the iterative impedance may be obtained by applying the definition of iterative impedance, that is, by equating the unknown iterative impedance to the input impedance of the section when its output is connected to the same unknown impedance. It is perhaps simpler, however, to make use of the fact that the square of the iterative impedance is the product of the input impedances when the section is open-circuited and short-circuited at its center. By either method the square of the iterative impedance is found to be:

$$Z_i^2 = \frac{\left(\tan \theta_1 + p \tan \frac{\theta_2}{2}\right)\left(p \cot \frac{\theta_2}{2} - \tan \theta_1\right)}{\left(\cot \frac{\theta_2}{2} - p \tan \theta_1\right)\left(\tan \frac{\theta_2}{2} + p \tan \theta_1\right)} \quad (1)$$

which may also be written $$\frac{Z_i^2}{p^2} = \frac{\tan^2 \theta_1 - 2p \tan \theta_1 \cot \theta_2 - p^2}{\tan^2 \theta_1 - 2/p \tan \theta_1 \cot \theta_2 - 1/p^2} \quad (2)$$

in which expression $p$ stands for the ratio $Z_2/Z_1$.

Since a pass band occurs in any range of $\theta_1$ in which the above expressions are positive, it is evident that band limits are given by the roots of both the numerator and denominator of these expressions. If $p$ is either very small or very large the roots occur in closely spaced pairs, i. e., the pass bands are narrow. Within a pass band defined by a pair of roots of the numerator it is evident that the iterative impedance falls to zero at the band edges and has a maximum near mid-band. Denominator roots, on the other hand, define bands in which the iterative impedance rises to infinity at the band edges and is minimum at mid-band.

In a given structure the ratio $\theta_2/\theta_1$ is fixed as the frequency is varied, so that Expressions 1 and 2 can be simplified for a number of particular values of this ratio. For example, if $\theta_2 = \theta_1$, a series of pairs of band edges is given by $\tan^2 \theta_1 = 2p + p^2$ and another series by $$\tan^2 \theta_1 = \frac{2}{p} + \frac{1}{p^2}$$

These expressions hold good for either neck-type or slug-type filters, the former type being defined as one having a value of $p$ small compared to unity while the latter has $p$ large compared to unity. Perhaps the most important case in practice to which the above equations apply is the slug-type filter with quarter-wave tanks and quarter-wave slug, shown in Fig. 4c and in Fig. 2. The first of the two equations is used since a large value of $\tan \theta_1$ is required. In this case the angular difference between the values of $\theta_1$ satisfying the equation is readily determined to be approximately $$\frac{2}{p}\left(1 - \frac{1}{p}\right)$$

for large values of $p$. Since the total angular length of the two tanks is $\pi/2$, the fractional band width, that is, the ratio of band width in cycles per second to the mid-band frequency in cycles per second, is $$\frac{4}{\pi}\frac{1}{p}\left(1 - \frac{1}{p}\right)$$

It may be noted in passing that the equations indicate the existence of pass bands when the coupling elements are a multiple of a half-wave in length, but the fractional band width in this case is determined by the square root of $p$ (or its reciprocal, according to the type of filter), so that in such case an impractically great disparity between tank and coupler impedances is required to obtain a narrow band.

Figure 4A:
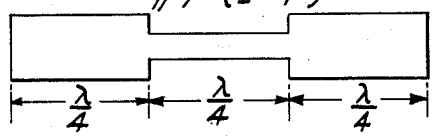
Figs. 4a, 4b, 4c and 4d are schematic representations of various types of single section filters.
Figure 4B:
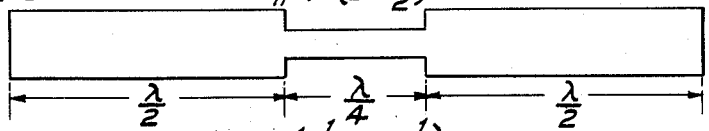

Another important case in practice is $$\theta_2 = \frac{\theta_1}{2}$$

for which a straightforward solution gives an approximate fractional band width $$\frac{2}{\pi}p\left(1 - \frac{p}{2}\right)$$

for tanks a half-wave long and small $p$, again with a quarter-wave coupling element. Again, there are other pass bands of lesser interest for the same structure, which structure is shown in Fig. 4b and in Fig. 1.

One more particular case of importance is $$\theta_2 = \frac{1}{3}\theta_1$$

with large $p$. This covers a section composed of resonators three quarter-waves long coupled by a slug one-quarter wave long, shown in Fig. 4d. This is a desirable section for a slug-type filter because the drive and take-off resonators have motional nodes available for the coupling coils. The fractional band in this case is approximately $$\frac{4}{3\pi}\frac{1}{p}\left(1 - \frac{1}{3p}\right)$$

for large values of $p$. Comparing this band with the band previously found for a section with quarter-wave resonators coupled by a quarter-wave slug, shown in Fig. 4c, it will be seen that the band width is nearly, although perhaps not exactly, inversely proportional to the number of quarter-waves composing the resonator. This result agrees with physical concepts since the band width is determined by the total kinetic energy of vibration of the resonator as compared with the energy stored in the coupling element.

By an analysis similar to those above, the fractional band width for a section in which $\theta_2 = \theta_1$, with $p$ small compared to unity, may be found. A single section filter of this type is shown in Fig. 4a as quarter-wave resonators coupled by a quarter-wave neck. The fractional band width in this case is approximately $$\frac{4}{\pi}p(1-p)$$

It may be noted, from the foregoing equations, that $p$ or $$\frac{1}{p}$$

must be proportional to or of the order of the desired fractional band width.

While the band width can be expressed explicitly for various simple relations between $\theta_1$ and $\theta_2$ as illustrated above, it can also be determined approximately in the general case, at least for the case of narrow bands. For, referring back to Equations 1 and 2, the roots of the numerator occur when $$\tan \theta_1 = p \frac{\cos \theta_2 \pm 1}{\sin \theta_2}$$

while roots of the denominator occur when $$\tan \theta_1 = \frac{1}{p} \frac{\cos \theta_2 + 1}{\sin \theta_2}$$

If, now, the band is sufficiently narrow so that $\sin \theta_2$ can be considered as constant throughout the band, then the angular bands between roots are approximately $$\frac{2p}{\sin \theta_2}$$

for $p$ very small, and $$\frac{2}{p} \frac{1}{\sin \theta_2}$$

for $p$ very large. From these expressions, it is evident that in every case the band width is minimum when $\sin \theta_2 = 1$, i. e., when the coupling element is an odd multiple of a quarter-wave long. This is an important feature of the present invention. However, it will also be noted that considerable departure from the quarter-wave optimum length of coupler element is possible without much increase in band width.

A reasonably convenient graphical solution for Equation 1 which applies to any ratio $\theta_2/\theta_1$ can be carried out as follows: Two circles are drawn with their centers on the origin, one with radius unity and the other with radius $p$. Straight lines are drawn tangent to each circle at its top, bottom, and two sides. A line from the origin at angle $\theta_1$ intersects lines tangent to the unit circle at points proportional to $\tan \theta_1$ and $\cot \theta_1$. Another line at angle $$\frac{\theta_2}{2}$$

intersects the $p$ circle tangent lines at points giving $p \tan$ $$\frac{\theta_2}{2}$$

and $p \cot$ $$\frac{\theta_2}{2}$$

By revolving the two lines from the origin while keeping the ratio of their angles constant, the value of $\theta_1$ may be determined which makes the numerator of Expression 1 vanish. The same construction will give all the roots. However, as this method of analysis is not likely to be required in view of the solutions already obtained for the more important practical cases, it will not be elaborated in further detail. From Figs. 4a–4d, approximate band widths for tanks of greater length can be inferred by assuming the band width varies inversely as the tank length, while the band width is substantially unaffected by the length of the coupling element, so long as it is an odd multiple of a quarter-wave. Since the band width is narrower the greater the tank length, the band may be narrowed by adding an integral number of half-wavelengths to the tank. In general, for a given $p$ the band is narrowest when the coupler is a quarter-wave long and is also narrower the longer the tank.

Figure 4C:
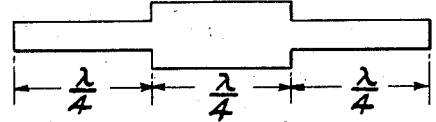
Figure 4D:
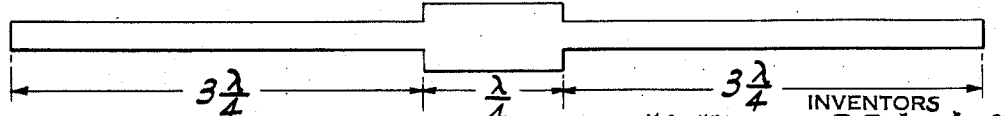

It should be noted that Figs. 1 and 2 may represent either figures of rotation or structures cut out of sheet metal, or any other structure having uniform impedance along each of its distinct portions. A multisection filter may be built up by connecting several of the single-section units end-to-end, the pass band and impedance being the same as for the single section. By way of example, Fig. 11 shows a two-section slug-type filter made of two sections as shown in Fig. 4c connected end-to-end.

*Practical limitations on narrowness of band width*

In a mechanical filter, the characteristic or mechanical impedance of each portion is the product of its cross-sectional area and the intrinsic impedance of the material of which it is made, the latter quantity being in turn the product of its density and the velocity of propagation of longitudinal waves along that portion. If all of the filter is made of the same material, the quantity $p$ is simply the ratio of cross-sections, assuming that the sections are small enough so that the sound velocity is the same in all portions. As has been demonstrated, $p$ or $1/p$ must be of the order of the desired fractional band width. If a 1 per cent band is required, this means that a neck-type filter turned out of round stock must have a neck diameter only about one-tenth that of the tanks. It is easy to see that narrowness of band is limited by flimsiness of the structure. Matters are even worse if the filter is cut out of flat strip material (which would otherwise be a desirable construction because of the ease of punching such filters out in quantity), because in this case the neck width must be $p$ times the tank width.

At this point, it might be thought that while there is a limit to the smallness of $p$ practically obtainable in neck-type filters, $p$ could be made as large as desired in slug-type filters by simply making the slug large enough. Unfortunately, however, if the diameter of the slug is made too large it begins to vibrate in various undesired or spurious modes. Such undesired responses could perhaps be dodged by careful design or could even be employed to provide rejection points outside the pass band, but for present purposes it appears preferable to keep the design as non-critical as possible by keeping all extraneous responses well away from the desired pass band.

A simple expedient for narrowing the band of the type of section heretofore discussed, without changing the practically obtainable value of $p$, is to use longer tanks. This, however, cannot be carried too far, as it results in an inconveniently long filter if many sections are employed, and also brings other pass bands too close to the desired band.

In accordance with an aspect of the present invention, another expedient for narrowing the band width which may be employed, in slug-type filters, is to use for the slugs (or for the higher impedance elements), at least in part, a material having higher intrinsic impedance than the material used for the tanks or low impedance elements.

As an example of this expedient, Fig. 5 shows a filter section composed of a cylinder 7 of high impedance material, such as steel or nickel, which is drilled and soldered to a cylinder 8 of low impedance material, the cylinder 7 thereby forming a slug on tank 8. The tank cylinder or rod 8 may be aluminum, which has a low intrinsic impedance, with nickel plating. This nickel plating not only makes it possible to solder the aluminum tank 8 to the steel coupling element or slug 7, but also, in accordance with the principles disclosed in the copending Burns application, Serial No. 84,373, filed March 30, 1949, now Patent No. 2,619,604, issued November 25, 1952, makes possible magnetostriction driving of, and take off from, the tanks.

Another expedient which constitutes a further phase of the present invention is to use thin-walled nickel tubing for the tank 8 of Fig. 5, so as to reduce its cross-sectional area without a corresponding loss of sturdiness. In other words, by using tubing for the tank, the ratio $p$ is greatly increased without making the structure unduly flimsy. Also, the eddy current losses are lessened, compared with solid rod, when inserted in driving and take-off coils.

Both of the expedients just discussed (that is, the use of materials of different intrinsic impedance for tanks and coupling elements, and the use of tubing rather than rod) are also applicable to neck-type filters. Fig. 6 is an illustration of this concept. In said figure, the two high impedance tanks 9 and 10 of nickel or steel are drilled and soldered onto the two end portions of a thin-walled tube 11 of low impedance material such as aluminum, elements 9 and 10 thus forming tanks which are coupled by a neck-type coupling element 11. Alternatively, the coupling element 11 could be a rod rather than a tube if desired.

By the use of one or more of the above-described expedients, pass bands sufficiently narrow for many purposes have been obtained without undue flimsiness of structure.

Fig. 7 illustrates a further modification that has proved very satisfactory in practice. The structure of Fig. 7 is somewhat similar to that of Fig. 5, but in Fig. 7 a steel ball bearing 12 (annealed for easy drilling) is soldered on a nickel rod 13. Although element 13 is shown as a rod, it is desired to be made clear that thin-walled nickel tubing may be utilized for element 13, rather than a rod, and in fact it has been found preferable to do so. In Fig. 7, the steel ball 12 is substituted for the cylindrical coupler 7 of Fig. 5.

While the filter of Fig. 7 is not readily analyzed mathematically, it has been found that a ball diameter of about a quarter-wavelength is suitable, the band width being controlled by the choice of tube or rod diameter and tube wall thickness. Experience indicates that balls are less likely to develop extraneous resonances than the corresponding cylindrical slugs because the lowest natural frequency of a ball a quarter-wavelength in diameter is nearly twice the operating frequency. Thus, if the tank can be made to give the desired band width, the ball is less susceptible to spurious modes of vibration than the corresponding cylindrical coupler of Fig. 5. The lowest natural frequency of a steel ball one inch in diameter is about 100 kilocycles, while for other sizes the frequency is inversely proportional to diameter.

The structure of Fig. 7 may be termed a ball-coupled section, and a plurality of such sections may be placed end-to-end to form a multiple-section filter somewhat similar to the multiple-neck and multiple-slug types to be described later in connection with Figs. 8 and 9. Of course, the placing of the Fig. 7 sections end-to-end has been described merely for illustrative purposes; actually, such a multiple-section ball-coupled filter would be constructed by mounting a plurality of balls at appropriate intervals on a single section of tubing or rod. Such a multiple-section ball-coupled filter can be made to have a narrow enough pass band for most purposes.

*Filters for very narrow bands*

From the foregoing, it may be seen that to obtain bands as narrow as the high Q of aluminum makes possible, or to obtain moderately narrow bands in the case of filters punched out of strip or sheet stock, some radically different method for obtaining sufficiently loose coupling is necessary. Many such methods have been tried, with more or less success. For example, the coupling element may be connected between points on the tanks near motional nodes, where the same coupling element is less effective. Again, linear tanks may be coupled by inertia effects, for example, by one or more small steel ball bearings pressed between the sides of parallel tanks; the different kinetic energies imparted to the balls when the tanks vibrate in and out of phase produce two natural frequencies in the system and the band width is less the nearer the balls are located to motional nodes of the tanks.

But the simplest and most satisfactory method so far discovered for obtaining a very narrow band is to use what will be called multiple-neck or multiple-slug coupling elements. This arrangement permits extremely loose coupling between tanks without requiring excessive ratios of impedances of the various parts of the filter.

Figs. 8 and 9 represent neck and slug-type sections coupled by twin elements.

In Fig. 8, two high-impedance tanks 14 and 15 are coupled by twin quarter-wave necks 16 and 17 separated by a quarter-wave slug 18. Fig. 8 therefore shows high impedance tanks coupled by multiple necks.

In Fig. 9, two low-impedance tanks 19 and 20 are coupled by twin quarter-wave slugs 21 and 22 separated by a quarter-wave neck 23. Fig. 9 therefore shows low-impedance tanks coupled by multiple slugs.

A physical picture of the operation of both of these coupling systems, for example that of Fig. 8, may be had by considering one element, say 16, adjacent to a tank 14 as the actual coupling element while the other two, say 18 and 17, act as two quarter-wave transformers in tandem which transform the impedance of the other tank 15 to a value still further out of line with that of the coupling element 16, the impedance transformation, more specifically, being equal to the square of the ratio of their individual impedances. This results in a narrower band than that given by Figs. 1 and 2 for the same ratio of impedances of the elements. The central elements 18 and 23 of the sections of Figs. 8 and 9 need not be of the same impedance as the tanks, but it facilitates analysis and is a convenient construction.

The pass bands and terminating impedances of Figs. 8 and 9 may be determined, exactly as in the case of the simple coupling elements, by obtaining an expression for the iterative impedance of the section. The derivation is, of course, more lengthy and leads to a more complicated expression for the square of the iterative impedance, namely, $$\frac{Z_1^2}{p^4} \times \frac{\tan^4\theta - (p^4+2p^3+3p^2+4p)\tan^2\theta + (2p^3+3p^2)}{\tan^4\theta - (1/p^4+2/p^3+3/p^2+4/p)\tan^2\theta + (2/p^3+3/p^2)} \quad (3)$$

when all five elements of the section are of equal length and when the low impedance portions are equal and the high impedance portions also equal. The pass bands include those frequencies which make Expression 3 positive. The bands of chief interest are those which occur when the elements are in the vicinity of a quarter-wave long, or an odd multiple thereof. The band width may be accurately computed by means of Expression 3, but for practical purposes it is usually sufficient to figure that the band is narrower by the factor $p$ (or $$\frac{1}{p}$$

for slug-type filters) as compared to the corresponding filter with a single coupling element.

In Fig. 9, the two slug portions 21 and 22 are separated by a fully-defined neck portion 23, while in Fig. 2 there is a single slug 6 separating the two low-impedance tanks 4 and 5. It has been found, according to this invention, that it is possible to achieve some of the desirable or narrow-bandwidth results of the twin-type filter of Fig. 9 by modification of the Fig. 2 embodiment without, however, going to a fully-defined neck portion intermediate two slugs as in Fig. 9. In other words, it is possible to obtain some of the advantages of the Fig. 9 design while utilizing essentially only the single-slug construction of Fig. 2. More particularly, if the slug 6 of Fig. 2 is 3/4-wavelength long, a V-shaped notch may be cut out of the central portion of slug 6, for example by the use of a lathe, this slot extending entirely around the circumference of slug 6. The band width obtainable by this expedient varies with the depth of the notch, the deeper the notch, the narrower the band width, "band" here referring to the pass band of the filter. Such a notched-slug construction provides a wider pass band than the twin-element construction of Fig. 9 and a narrower pass band than the single-unit slug-type filter construction of Fig. 2.

Although in Fig. 8 the slug 18 has approximately the same transverse dimension as the tanks 14 and 15, this does not necessarily need to be the case, as slug 18 may have either a larger or smaller transverse dimension than do the tanks 14 and 15, as long as the mechanical impedance of said slug has the proper relation to that of necks 16 and 17.

Another factor $p$ may be obtained by adding another pair of quarter-wave elements to form a triple-neck or triple-slug coupling. In other words, the band may be narrowed still further by adding more pairs of large and small quarter-wave elements. Thus, by using a sufficient number of elements in the coupler it is possible to obtain as narrow a band as desired, without requiring $p$ to be impractically large or small.

Fig. 10 shows, for example, a two-section filter made of sheet nickel that has, in the design illustrated, one pass band from 94.7 to 97 kilocycles and another from 276 to 279.5 kilocycles. In this particular design, the large end tanks 24 and 25 were each one inch long, the end tanks each being joined to a large central element 26 by a series of three small quarter-wave elements 27, 28 and 29 and two large quarter-wave elements 30 and 31, the large and small quarter-wave elements alternating between each end tank and the central element. The central element was two inches long, elements 27—31 each being 1/2-inch long. The ratio of widths of the large and small elements, which in this case is $p$, was 3:1. The overall length of this filter, excluding permanent magnets, is nine inches.

End tanks 24 and 25 are magnetized by permanent magnets 32 and 33 and are located in drive and take-off coils 34 and 35, respectively. The Fig. 10 arrangement is a two-section filter, in that each half of the structure, that is, one end tank, half the central element, and the quarter-wave elements between them, is a single-section filter.

Another way of looking at the multiple coupler is to consider it as a low pass filter operating above cut off, and hence atttenuating vibrations passing through in either direction. From this point of view, it is evident that other forms of filters, operating in an attenuating band, could be employed as loose coupling means between tanks of the composite filter.

Filters including multiple-section coupling elements, and more particularly multiple-neck filters of the type illustrated in Figs. 8 and 10, are more particularly disclosed and claimed in the copending Roberts divisional application, Serial No. 172,746, filed July 8, 1950.

*Distinction between sheet and turned filters*

As previously stated, it should be appreciated that a filter turned out of round stock will give a much narrower band, for the same ratio of coupling element diameter to tank diameter, than will one punched out of sheet material, because in a figure of revolution the impedance ratio $p$ is the square of the dimension ratio. To give an illustration, it has been found easy enough to obtain a band of the order of 100 cycles, at 100 kilocycles, in a filter like that of Fig. 9, by using nickel-plated $\frac{3}{32}$" aluminum rod for the tanks, with two coupling slugs 21 and 22 per section comprising $\frac{1}{16}$" cylindrical steel slugs soldered on the aluminum rod.

The filters of this invention operate at frequencies up to a limit (at least 500 kc.) set chiefly by the decreasing dimensions of the parts.

*Choice of materials*

For the internal sections of any filter, it is generally desirable to use a material of the highest possible Q. For this reason aluminum would be the unquestioned choice, except for its large temperature coefficient of frequency (about 200 parts per million per degree C.). Where temperature stability is of primary importance, some isoelastic material, such as the nickel alloy "Ni-Span C," may be used. This alloy has good magnetostrictive activity and better Q than nickel, but is not as yet obtainable in thin-walled tubing. It is available in standard wire gauges, and filters have been made by soldering steel balls on the wire. Although the Q of nickel is low compared to some other metals, it is still high enough for filters that are not extremely narrow band and do not require extremely sharp cut-off. These three materials are the ones that have been mostly used. The steels have high Q but have much higher intrinsic impedance than aluminum which, as will be shown later, makes it more difficult to terminate the filter nonreflectively. Thin-walled steel tubing, however, might be a good choice in some cases. Brass has a good enough Q and is easily nickel plated, but has relatively low compressional wave velocity, so that the elements may be inconveniently short at high frequencies. The choice of material depends somewhat on the band width, the narrower the band, the lower loss the material should be to give sharp cut off.

*Drive and take-off methods*

For most purposes, the mechanical filter must be driven from an electrical source and deliver power to an electrical load. The material used for the drive and take-off tanks must of course be magnetostrictive, if this type of electromechanical conversion is to be used. Furthermore, the mechanical losses in these tanks need not be so low as in the interior tanks. Since losses must be somehow embodied in one or both end tanks to terminate the filter satisfactorily, it may be necessary to choose a lossy material in case the damping introduced by the tuned coils on the ends of the filter is not sufficient. For many cases, thin nickel sheet or thin-walled nickel tubing makes a good end tank. For extremely narrow bands, however, nickel-plated aluminum comes nearer to providing the relatively low damping called for by the narrow band.

In broad band filters, when the highest conversion efficiency is required, other materials may be utilized. The main objection to magnetostrictive operation is poor efficiency, especially at the higher frequencies, due to eddy current losses in materials such as nickel or nickel alloys. This drawback can, however, be largely overcome by employing a material with very low eddy current losses. Ferrites, which are magnetic, ceramic materials, have negligible eddy current losses and a mechanical Q of the order of one or two thousand. Also, ferrites have been developed which have as large a magnetostriction coefficient as nickel, so that considerable damping can be obtained by electrical reactions. If the end half-wavelength elements of a filter be replaced by half-wavelength elements of ferrite, of the same characteristic impedance, a very efficient conversion is possible, in part because of the low mechanical and electrical losses.

Drive and take-off ferrite resonators may be cemented to the filter metal, or the ferrite elements may be copper-plated at one end to permit soldering to the filter.

As an alternative to a mechanical joint, the ferrite element can be held against the remaining part of the filter by spring pressure exerted through an auxiliary low pass filter, such as previously described in connection with multiple-element couplers. Such a construction is more particularly described and claimed in the copending Roberts application, Serial No. 93,372, filed May 14, 1949, now Patent No. 2,578,452, issued December 11, 1951.

Fig. 10 illustrates a drive and take-off arrangement typical of all the magnetostrictively-operated filters of this invention. Closely-fitting coils 34 and 35 are placed over the middle of the end half-wave elements 24 and 25 of the filter, to provide magnetostrictive coupling. Permanent magnets 32 and 33 are located so as to magnetize the parts of the filter under the coils in a longitudinal direction. The magnetic field is adjusted to give maximum drive, which requires that the material be something like half saturated; the shorter the piece of magnetostrictive material, the stronger the field required. The impedance of the driving coil has a large resistive component, due partly to losses in the material and partly to the motional reaction of the filter.

*Terminations*

A filter should be terminated in a resistance equal to the iterative impedance of the section, and this is not constant over the band, as has been noted. Without some form of damping in the filter, the output consists of a series of peaks with deep valleys between. If the filter is made of relatively low Q material such as nickel, and is sufficiently narrow band, the peak-to-valley ratio may be satisfactory without any additional terminating resistance. The same is of course true of any material, if the band be made narrow enough. But perhaps the only way to get a perfect termination, without depending on losses within the filter, is to extend the filter a few sections beyond the take-off point and introduce sufficient losses into these extra sections so that vibrations entering these sections are substantially damped out by the time they are reflected back to the pick-up point. This arrangement, however, allows most of the power transmitted to flow past the pick-up point, and relatively little into the useful load.

The best compromise method so far discovered is to provide the tightest possible magnetostrictive coupling between the drive and take-off filter elements and their associated coils, which assures maximum power transfer and also provides a corresponding amount of mechanical damping of the end resonators, and then if the peak-to-valley ratio is still too great, to add mechanical resistance until the best-shaped response curve is obtained. It may be necessary to add mechanical resistance or damping, in addition to the electromagnetic damping of the circuits due to the tight coupling, where the band is wide or where the end tank losses are too low. It has been found that a thin coating of silicone grease or vaseline, applied to the end resonators, will provide considerable damping. The viscosity of the silicone grease is less variable with temperature than is that of ordinary oils and greases.

A theoretically better way to add a pure mechanical resistance is to connect the end of the filter to a long rod of lossy material having a characteristic impedance chosen (by giving it the correct diameter) to match the filter impedance somewhere inside the band. In practice, a rather short rod-shaped piece of an elastometric or rubber-like plastic material having a high damping factor, such as cellulose nitrate for example, cemented by its own solvent to the filter tip, has been found to reduce very bad peak-to-valley ratios to an acceptable value.

Of course, it is desirable to provide as great as possible a proportion of the required damping by the reaction of the drive and take-off circuits; for this reason, the mechanical impedance of the tanks should be made as low as possible in proportion to the magnetostrictive coupling. For example, if the take-off tank is a nickel-plated aluminum tube of given diameter and thickness of plating, then, the thinner the wall, the less the filter impedance and hence the less the terminating resistance required. Thus, since the reaction damping is constant, it should be possible to make the wall thin enough so that no extra damping is needed. On the other hand, if the end tank is nickel-plated solid rod, it will be seen that small diameter favors the ratio of magnetostrictive coupling to filter impedance.

*Tuning-up methods*

The individual resonators of a filter should be tuned to the same frequency. It is probable that commercially-manufactured filters can be made to such close tolerances that no tune-up will be required, providing the band width is large compared with the tolerance. However, very narrow band filters and experimental filters will usually require tuning up.

If the tanks are made of magnetostrictive material, or are nickel-plated to make them have this characteristic, then a coil placed around any one tank to excite it, while adjacent tanks are clamped, may be used to determine the resonant frequency of the tank being tested, by the change of the apparent coil impedance at the resonant frequency of suck tank. It should be brought out that, for the purpose of testing the tanks of a complete filter, all the tanks not being tested must be so damped or detuned as to leave the frequency of the free tank in the test coil substantially unaffected by resonance of the others. This can usually be accomplished by putting tight-fitting clamps on the adjacent tank or tanks; gripping the adjacent tanks firmly between the fingers will sometimes be sufficient.

If it is found that any one resonator is too far out of line with the others, it is tuned either up or down by filing. Filing away material at motional loops increases the resonant frequency, while filing at nodes, to reduce its cross-section, decreases it. For decreasing the frequency of a neck-type filter, it is more of a reversible operation to put a ring or spot of solder on a motional loop at one or both ends of the resonator to lower the frequency, excess solder being filed off until the frequency is correct.

Torsion filters

Any of the foregoing filters that have circular cross-section throughout will operate with torsional waves, the wave length, however, being about 60% of that of linear vibration at the same frequency, but being independent of the diameter of the element, like the linear vibration wave length, at least for sufficiently small diameters. This makes low frequency filters more compact, but is undesirable for frequencies so high that tanks are already inconveniently short.

Torsional operation has one important advantage, however, that may outweigh any disadvantages thereof, especially at frequencies so low that the drive and take-off angular vibrations may be converted to linear motions by simple mechanics. This advantage is that the quantity corresponding to characteristic impedance is in the case of torsional operation determined by the moment of inertia of the element about the axis and not by the cross-sectional area, and is proportional to the fourth power of the diameter rather than to the square thereof, as was the case for linear or longitudinal vibrators. So, a moderate ratio of diameters suffices to give a large ratio of impedances. Thus, the same filter which gives a wide band when operated linearly will give a narrow band when operated in torsion, even though only a simple coupling element is used. Or, to put it another way, a narrow band torsion filter can be made without a very great disparity in diameter between the tank and coupler portions.

In order to use a filter in the torsional mode, some modification of the drive and take-off arrangement is necessary. The simplest scheme that has been found is to nickel-plate only one-half of the circumference of the drive and take-off tanks and to apply a transverse magnetic field in the plane including the edges of the plating. The combination of the constant transverse magnetization with the alternating longitudinal magnetization produced by the driving coil gives a resultant magnetization which swings back and forth in direction about a mean position approximately transverse to the axis of the resonator, thus tending to twist the resonator ends first one way and then the other about the central plane.

Other methods for providing torsion drive include maintaining a steady "bias" torque on the resonator through some form of low-pass connection, or by obtaining bias twist of nickel plating by keeping the resonator twisted during plating and freeing it afterwards, or by twisting beyond the elastic limit before plating and annealing afterwards. Or, the plating may be applied in thin spiral strips. In each case the coil and field arrangements are the same as for longitudinal drive.

A particular application of the torsion filter is for extremely narrow band operation, which can be achieved by the use of multiple-neck coupling and which is made possible by the fact that magnesium has a uniquely high Q when operated in torsion, namely about 100,000.

Torsional filters of the type described above are more particularly disclosed and claimed in the copending divisional application, Serial No. 166,618, filed June 7, 1950.

It will be seen, from all of the foregoing, that the objects of this invention have been accomplished. Band pass filters having extremely narrow pass bands have been devised. Moreover, small, simple and cheap band pass filters for low radio frequencies have been provided according to the teachings of this invention.

What I claim to be my invention is as follows:

1. A mechanical filter section, comprising a pair of spaced resonant elements joined by a coupling element, each of said elements being adapted to transmit mechanical vibrations, said coupling element having a length of substantially an odd multiple of a quater-wavelength therein at the frequency of operation of said filter section and having a mechanical impedance different from that of said resonant elements and said resonant elements each having a length of substantially an odd multiple of a quarter-wavelength therein at said frequency.

2. A mechanical filter section, comprising a pair of spaced resonant elements each having a length of substantially an odd multiple of a quarter-wavelength therein at the frequency of operation of said filter section, and coupling means therebetween including a vibratile member having such dimensions that its resonant frequency falls outside the operating pass band of said section, said coupling means having a dimension equal to an odd multiple of a quater-wavelength therein and having a mechanical impedance different from that of said resonant elements.

3. A mechanical filter section as defined in claim 2, wherein said resonant elements are constituted at least in part by metallic rod.

4. A mechanical filter section as defined in claim 2, wherein the vibratile coupling member is a sphere.

5. A mechanical filter section as defined in claim 2, wherein the vibratile coupling member is a sphere the lowest resonant frequency of which is substantially above the operating pass band of the section.

6. A mechanical filter, comprising a plurality of spaced substantially similar resonators linearly arranged and having predetermined mechanical impedances, and at least one coupling element positioned between said resonators and adapted to couple compressional waves from one resonator to another, said coupling element having a mechanical impedance higher than the mechanical impedances of said resonators and having a maximum dimension of substantially an odd number of quarter-wavelengths therein at the frequency of operation of said filter, at least a portion of said element being made of a material different from that of said resonators.

7. A mechanical filter, comprising a plurality of spaced substantially similar resonators linearly arranged, and at least one coupling element positioned between said resonators and adapted to couple compressional waves from one resonator to another, said coupling element having a cross-sectional area greater than that of said resonators and having a maximum dimension of substantially an odd number of quater-wavelengths therein at the frequency of operation of said filter, at least a portion of said element being made of a material different from that of said resonators.

8. A mechanical filter, comprising a plurality of spaced substantially similar resonators linearly arranged, and at least one coupling element positioned between and joining adjacent ends of said resonators to each other, said coupling element having a cross-sectional area greater than that of said resonators and having a maximum dimension of substantially an odd number of quarter-wavelengths at the frequency of operation of said filter, said coupling element and said resonators being made of materials having different intrinsic impedances, the intrinsic impedance of the coupling element being greater than that of the resonators.

9. A mechanical filter as defined in claim 6 wherein said coupling element is a spherical metallic member.

10. A mechanical filter as defined in claim 6 wherein said resonators are in the form of metallic tubing.

11. A mechanical filter section comprising a pair of spaced substantially similar resonators linearly arranged and having predetermined mechanical impedances, said resonators each having a length of substantially an odd multiple of a quarter-wavelength therein at the frequency of operation of said filter section, and a coupling element positioned between said resonators and adapted to couple compressional waves from one resonator to the other, said coupling element having a larger cross section than said resonators and a mechanical impedance higher than the mechanical impedances of said resonators and having a length of substantially an odd number of quarter-wavelengths therein at the frequency of operation of said filter section.

12. A mechanical filter comprising a plurality of mechanical filter sections as defined in claim 11 connected end-to-end.

WALTER van B. ROBERTS.
LESLIE L. BURNS, Jr.

References Cited in the file of this patent

UNITED STATES PATENTS

| Number | Name | Date |
|---|---|---|
| 1,678,116 | Harrison | July 24, 1928 |
| 1,882,397 | Pierce | Oct. 11, 1932 |
| 2,052,008 | Woodruff | Aug. 25, 1936 |
| 2,091,250 | Blackman | Aug. 31, 1937 |
| 2,318,417 | Phelps | May 4, 1943 |
| 2,342,813 | Mason | Feb. 29, 1944 |
| 2,342,869 | Kinsley | Feb. 29, 1944 |
| 2,401,094 | Nicholson | May 28, 1946 |

OTHER REFERENCES

Pierce, "Magnetostriction Oscillators," Proceedings of the American Academy of Arts and Sciences, vol. LXIII, No. 1, April 1928, pp. 39 and 40. (Copy in Scientific Library.)

Magazine, "Electronics," vol. 20, No. 4, page 100, April 1947.